(12) United States Patent
Sugimoto (10) Patent No.: US 8,955,873 B2
(45) Date of Patent: Feb. 17, 2015

(54) AIRBAG APPARATUS AND AIRBAG COVER

(75) Inventor: Kazutaka Sugimoto, Tokyo (JP)

(73) Assignees: Takata Corporation, Tokyo (JP); Honda Motor Co., Ltd, Tokyo (JP)

(*) Notice: Subject to any disclaimer, the term of this patent is extended or adjusted under 35 U.S.C. 154(b) by 0 days.

(21) Appl. No.: 14/007,605

(22) PCT Filed: Mar. 29, 2012

(86) PCT No.: PCT/JP2012/058385
§ 371 (c)(1),
(2), (4) Date: Sep. 25, 2013

(87) PCT Pub. No.: WO2012/133659
PCT Pub. Date: Oct. 4, 2012

(65) Prior Publication Data
US 2014/0015232 A1 Jan. 16, 2014

(30) Foreign Application Priority Data
Mar. 31, 2011 (JP) .................................. 2011-077453

(51) Int. Cl.
*B60R 21/2165* (2011.01)
*B62J 27/00* (2006.01)
(Continued)

(52) U.S. Cl.
CPC ............. *B62J 27/00* (2013.01); *B60R 21/2165* (2013.01); *B60R 21/216* (2013.01); *B60R 21/217* (2013.01); *B60R 2021/0088* (2013.01); *B60R 2021/2161* (2013.01)
USPC .................................................... 280/728.3

(58) Field of Classification Search
CPC ....... B60R 21/20; B60R 21/2165; B62J 27/00
USPC .................................................... 280/728.3
See application file for complete search history.

(56) References Cited

U.S. PATENT DOCUMENTS 5,096,220 A * 3/1992 Nakajima .................. 280/728.3
5,292,150 A * 3/1994 Watanabe et al. .......... 280/728.3
(Continued)

FOREIGN PATENT DOCUMENTS

EP 1762440 A1 3/2007
JP 2007-069782 A 3/2007
(Continued)

OTHER PUBLICATIONS

International Search Report from the International Bureau of WIPO for International Application No. PCT/JP2012/058385 dated Jun. 26, 2012 (4 pages).
(Continued)

*Primary Examiner* — Nicole Verley
(74) *Attorney, Agent, or Firm* — Fitch Even Tabin & Flannery, LLP (57) ABSTRACT

An airbag apparatus or the like in which the form of breaking of a tear line can be made more stable, and the deployment positions of an airbag cover and a bag portion can be made more stable is provided.
An airbag apparatus includes a bag portion formed of a base cloth panel in a bag shape and deployed and inflated in front of a driver by being supplied with gas for deployment, an inflator that generates the gas for deployment, a retaining container in which the bag portion not in use is housed and at the top of which an opening is provided, and an airbag cover that substantially covers the opening of the retaining container when not in use and a front portion of which rises to uncover the opening when the bag portion is deployed and inflated. The airbag apparatus is provided in front of a seat of a saddle-ride type vehicle. The airbag cover has a tear line that is provided in the vicinity of the front end and extends substantially along the vehicle width direction and that is broken by input from the bag portion when the bag portion is deployed and inflated, and an opening is provided in the middle of the tear line in the vehicle width direction.

1 Claim, 9 Drawing Sheets (51) Int. Cl.
   *B60R 21/216* (2011.01)
   *B60R 21/217* (2011.01)
   *B60R 21/00* (2006.01)

(56) References Cited

U.S. PATENT DOCUMENTS

| | | | | |
|---|---|---|---|---|
| 5,573,267 | A * | 11/1996 | Yamakawa et al. | 280/728.3 |
| 5,582,424 | A * | 12/1996 | Okuyama et al. | 280/728.3 |
| 5,971,427 | A * | 10/1999 | Whited et al. | 280/730.2 |
| 7,398,991 | B2 * | 7/2008 | Hayashi et al. | 280/728.3 |
| 7,497,464 | B2 * | 3/2009 | Horiuchi et al. | 280/730.1 |
| 7,591,480 | B2 * | 9/2009 | Kreuzer | 280/728.3 |
| 7,614,657 | B2 * | 11/2009 | Miyata | 280/743.2 |
| 8,491,002 | B2 * | 7/2013 | Schneider et al. | 280/728.3 |
| 8,550,491 | B2 * | 10/2013 | Kuroe et al. | 280/728.3 |
| 8,585,078 | B1 * | 11/2013 | Witt et al. | 280/728.3 |
| 2001/0040367 | A1 * | 11/2001 | Nakashima et al. | 280/743.1 |

FOREIGN PATENT DOCUMENTS

| | | |
|---|---|---|
| JP | 2009-067236 A | 4/2009 |
| JP | 2010-158931 A | 7/2010 |
| JP | 2011-000962 A | 1/2011 |

OTHER PUBLICATIONS

European Search Report dated Aug. 20, 2014 for EP Application No. 12762852.7 (4 pages).

* cited by examiner

AIRBAG APPARATUS AND AIRBAG COVER

CROSS-REFERENCE TO RELATED APPLICATIONS

This application is a U.S. national phase application filed under 35 U.S.C. §371 of International Application PCT/JP2012/058385, filed on Mar. 29, 2012, designating the United States, which claims priority from Japanese Patent Application No. 2011-077453, filed Mar. 31, 2011, which are hereby incorporated herein by reference in their entirety.

TECHNICAL FIELD

The present invention relates to an airbag apparatus provided in a saddle-ride type vehicle such as a motorcycle and having a bag portion that deploys and inflates in front of an occupant at the time of a collision or the like, and an airbag cover provided in such an airbag apparatus.

BACKGROUND ART

It is proposed to provide a saddle-ride type vehicle such as a motorcycle on the vehicle body of which an occupant such as a driver straddles to ride, with an airbag apparatus having a bag portion that deploys and inflates in front of the occupant to restrain the occupant at the time of a collision or the like.

For example, in Japanese Unexamined Patent Application Publication No. 2011-000962A, there is described an airbag apparatus that houses a bag in a retaining box provided in front of an occupant's seat and that deploys and inflates the bag upward from the retaining box to restrain the upper body of an occupant at the time of a vehicle collision or the like.

In Japanese Unexamined Patent Application Publication No. 2011-000962 A, a front-opening cover having a hinge on the vehicle rear side thereof is provided on the top of the retaining box, and the bag portion is configured to inflate while push-opening this cover.

The cover serves to restrict the deployment direction so that the bag portion deploys and inflates in front of the occupant.

The cover is formed, for example, of a resin-based material. The hinge side and the opposite side of the cover are fixed to the retaining box. When the bag portion deploys and inflates, a tear line provided at the end on the side opposite to the hinge side of the cover breaks, and the cover is thereby opened.

The tear line is a fragile portion formed by reducing the thickness of a part of the cover in a groove-like fashion.

As a conventional art related to such a tear line of a cover, for example, in Japanese Unexamined Patent Application Publication No. 2007-069782 A, it is described to provide a tear line that tears when an airbag deploys and inflates, in an erect portion of a cover, and to form a plurality of holes through which belts are passed and that are spaced apart in the vehicle width direction, on the tear line.

In the above-described cover having a tear line, it is desired to make the form of breaking of the tear line closer to bilaterally symmetric, and to make the deployment positions of the airbag cover and the bag portion more stable.

In view of the above-described problem, it is an object of the present invention to provide an airbag apparatus in which the form of breaking of a tear line can be made more stable, and the deployment positions of an airbag cover and a bag portion can be made more stable, and an airbag cover.

In order to solve the above problem, an airbag apparatus of the present invention includes a bag portion formed of a base cloth panel in a bag shape and deployed and inflated in front of a driver by being supplied with gas for deployment, an inflator that generates the gas for deployment, a retaining container in which the bag portion not in use is housed and at the top of which an opening is provided, and an airbag cover that substantially covers the opening of the retaining container when not in use and a front portion of which rises to uncover the opening when the bag portion is deployed and inflated. The airbag apparatus is provided in front of a seat of a saddle-ride type vehicle. The airbag cover has a tear line that is provided in the vicinity of the front end and extends substantially along the vehicle width direction and that is broken by input from the bag portion when the bag portion is deployed and inflated, and an opening is provided in the middle of the tear line in the vehicle width direction.

An airbag cover of the present invention is an airbag cover provided in an airbag apparatus including a bag portion formed of a base cloth panel in a bag shape and deployed and inflated in front of a driver by being supplied with gas for deployment, an inflator that generates the gas for deployment, and a retaining container in which the bag portion not in use is housed and at the top of which an opening is provided, the airbag apparatus being provided in front of a seat of a saddle-ride type vehicle. The airbag cover substantially covers the opening of the retaining container when not in use, and a front portion of the airbag cover rises to uncover the opening when the bag portion is deployed and inflated. The airbag cover has a tear line that is provided in the vicinity of the front end and extends substantially along the vehicle width direction and that is broken by input from the bag portion when the bag portion is deployed and inflated, and an opening is provided in the middle of the tear line in the vehicle width direction.

According to each invention described above, the tear line breaks bilaterally symmetrically from the opening, and therefore the forms of deployment of the airbag cover and the bag portion can be made more stable.

As described above, according to the present invention, it is possible to provide an airbag apparatus in which the form of breaking of a tear line can be made more stable, and the forms of deployment of an airbag cover and a bag portion can be made more stable, and an airbag cover.

DETAILED DESCRIPTION OF THE PREFERRED EMBODIMENTS

Hereinafter, an embodiment of an airbag apparatus to which the present invention is applied will be described.

The airbag apparatus of the embodiment is provided, for example, in a motorcycle that is a saddle-ride type vehicle and includes a bag portion that deploys and inflates in front of an occupant at the time of a collision or the like.

Figure 1:
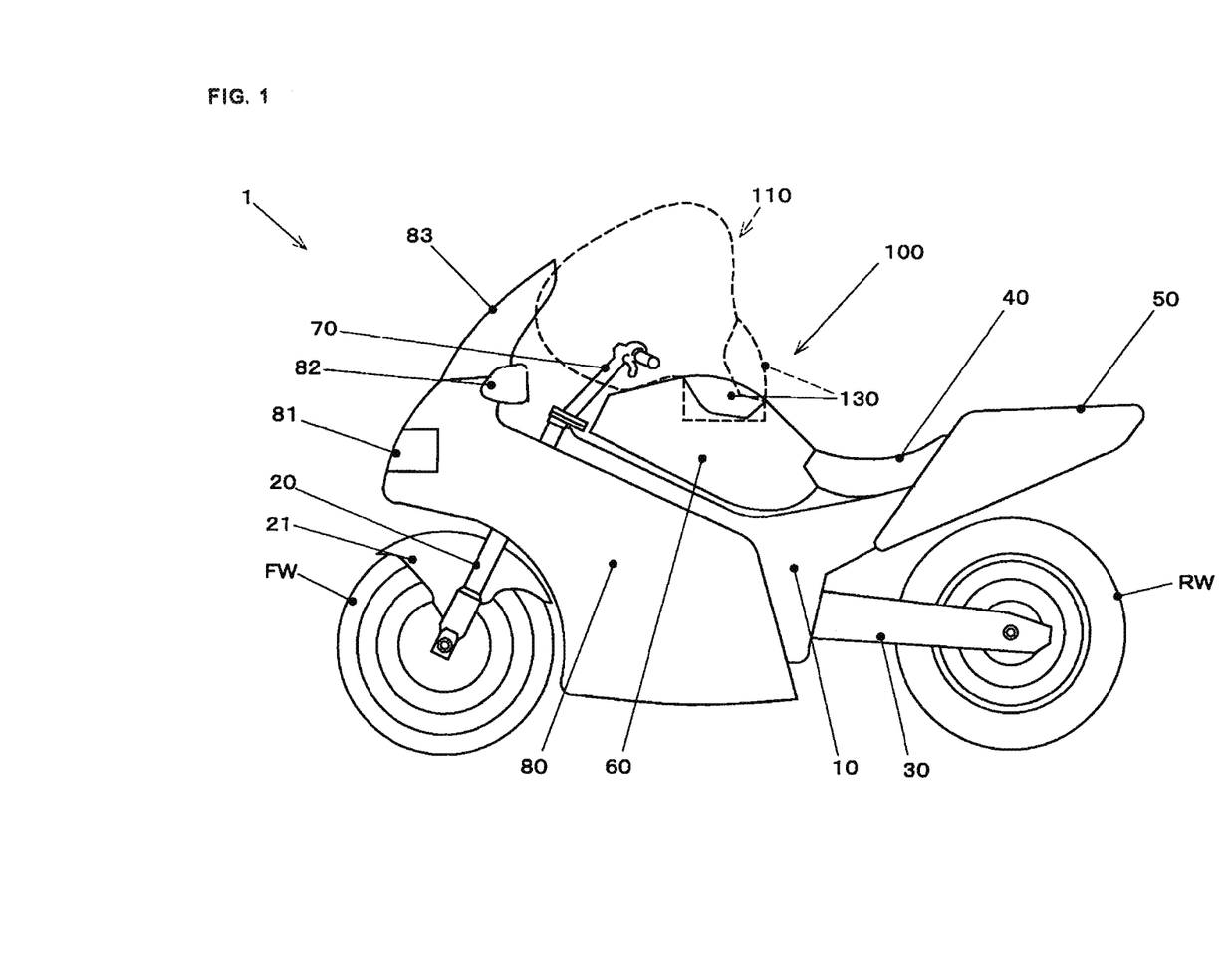
FIG. 1 is a schematic side view of a motorcycle having an embodiment of an airbag apparatus to which the present invention is applied.

FIG. 1 is a schematic side view of a motorcycle having the airbag apparatus of the embodiment.

Figure 2:
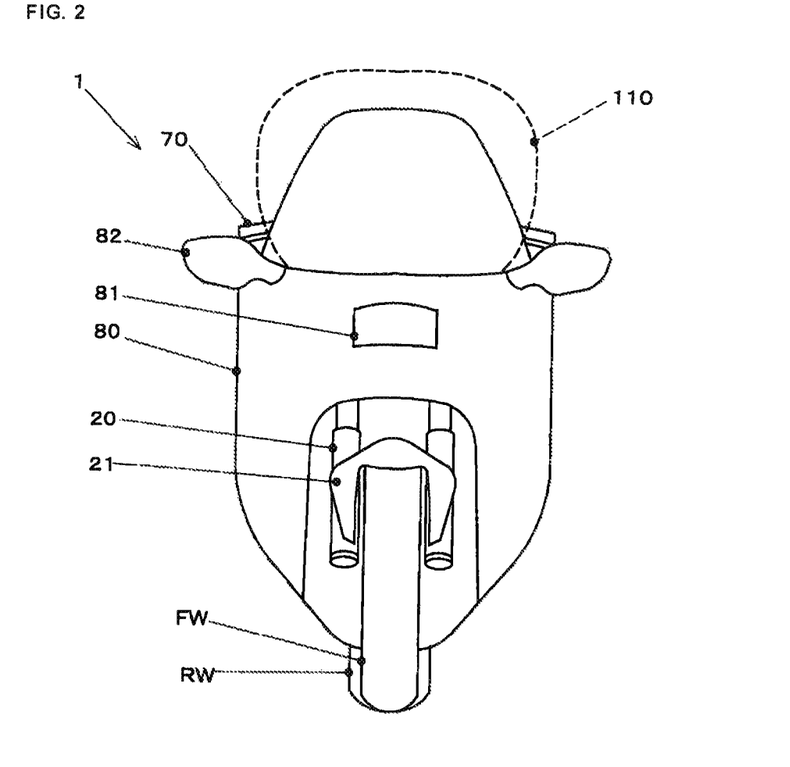
FIG. 2 is a schematic front view of the motorcycle of FIG. 1.

FIG. 2 is a schematic front view of the motorcycle of FIG. 1.

The motorcycle 1 includes a front wheel FW, a rear wheel RW, a frame 10, a front fork 20, a swing arm 30, a seat 40, a seat cowl 50, a tank 60, a steering handle 70, and a cowling 80.

The frame 10 is a structural member provided in the center of the vehicle body, and an engine, a transmission, and accessories such as a cooling device and a fuel supply device (not shown) are mounted in the lower portion thereof.

The front fork 20 is a member that is rotatably mounted at the front end of the frame 10 and that supports the front wheel FW, a front brake, and the like.

The front fork 20 is a telescopic front suspension in which a spring and a damper are housed and that is extensible and compressible.

A front fender 21 is provided over the front wheel FW in the front fork 20.

The swing arm 30 is a member that is provided so as to protrude rearward from the lower portion of the frame 10 and is swingably mounted to the frame 10 and that supports the rear wheel RW.

A spring damper unit (not shown) of a rear suspension is provided between the swing arm 30 and the frame 10.

The seat 40 is a portion on which the occupant sits astride, and is provided on the top of the frame 10.

The seat cowl 50 is an exterior member disposed behind the seat 40 and over the rear wheel RW.

The tank 60 is a container that is provided in the upper portion of the frame 10 in front of the seat 40 and that stores gasoline as fuel.

The tank 60 is provided at a position between the inner thighs of both legs of the occupant.

An airbag module 100 to be described later is provided in a part of the upper portion of the tank 60.

The steering handle 70 is an operating member that is formed so as to protrude from the top of the front fork 20 toward the rear of the vehicle and outward in the vehicle width direction and is gripped by the fingers of the occupant.

The steering handle 70 is provided with a front brake lever, a clutch lever, switches for various lights, and the like. The right-hand grip also serves as a throttle operating portion.

The cowling (fairing) 80 is an exterior member that is formed, for example, of a resin-based material and that covers the front portion of the vehicle body.

The cowling 80 is a full cowling that mainly covers the upper portion of the front fork 20, the front half of the frame 10, and the engine.

The cowling 80 includes a headlight 81, mirrors 82, and a windshield 83.

The headlight 81 is an illuminating device provided in the front surface portion of the cowling 80.

The mirrors 82 are rearview means provided at the upper left and right portions of the cowling 80.

The windshield 83 is a transparent portion provided on the top of the front surface portion of the cowling 80 and is used for protecting the occupant from the wind and the like.

As shown in FIG. 1, the airbag module 100 is provided in the upper portion of the tank 60. The airbag module 100 deploys and inflates the bag in front of the driver to receive and restrain the upper body of the driver at the time of a collision of the motorcycle 1 or the like.

Figure 3:
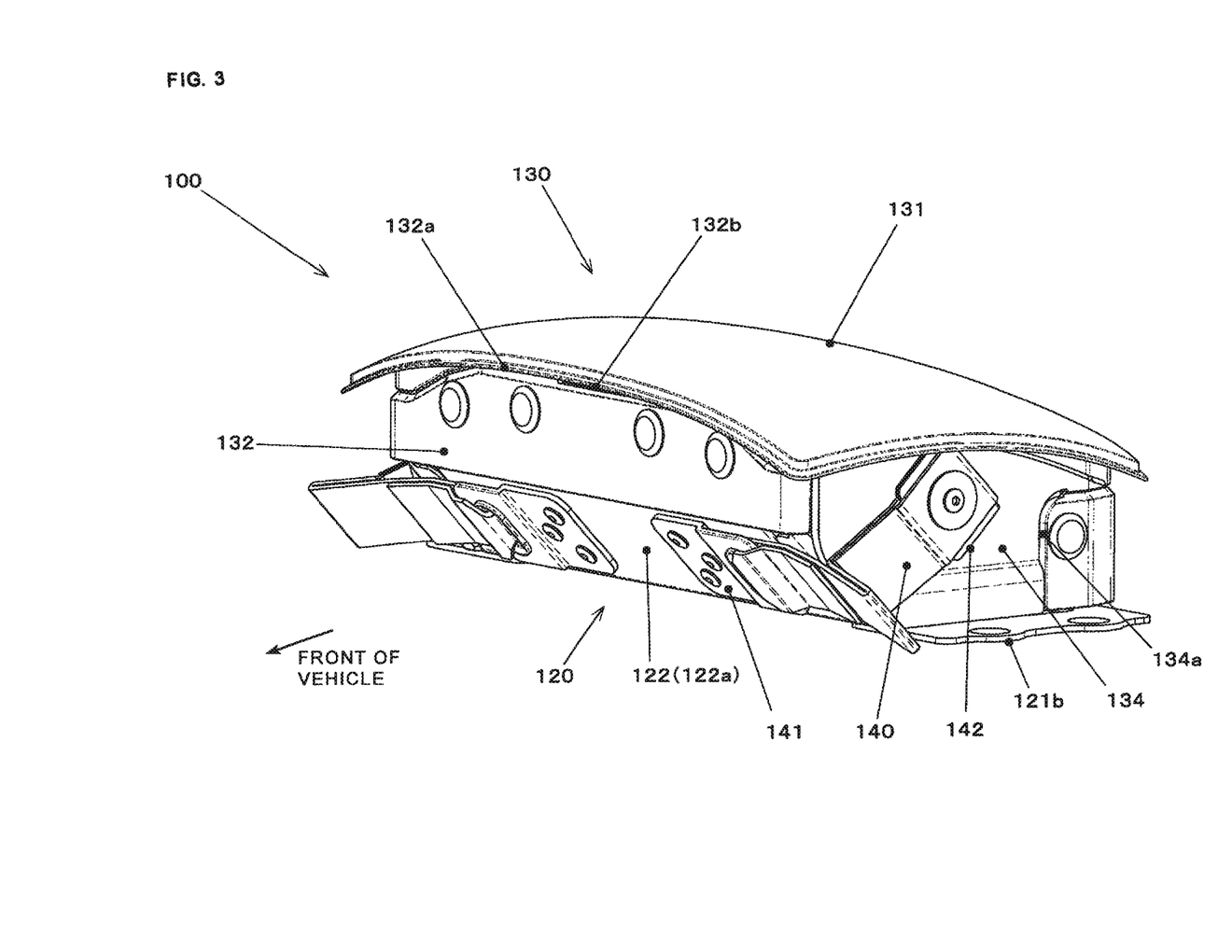
FIG. 3 is an exterior perspective view of the airbag module provided in the motorcycle of FIG. 1, with the cover closed (with the bag portion undeployed and uninflated).

FIG. 3 is an exterior perspective view of the airbag module 100, with the cover closed.

Figure 4:
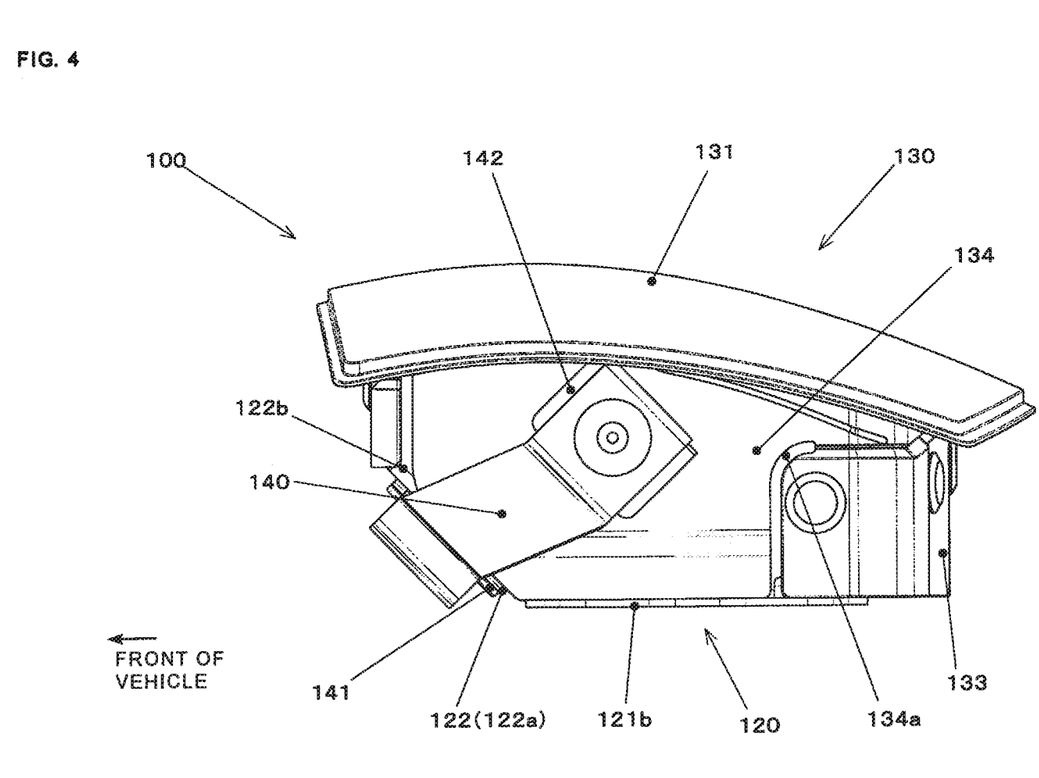
FIG. 4 is a side view of the airbag module of FIG. 3, with the cover closed.

FIG. 4 is a side view of the airbag module 100, with the cover closed.

Figure 5:
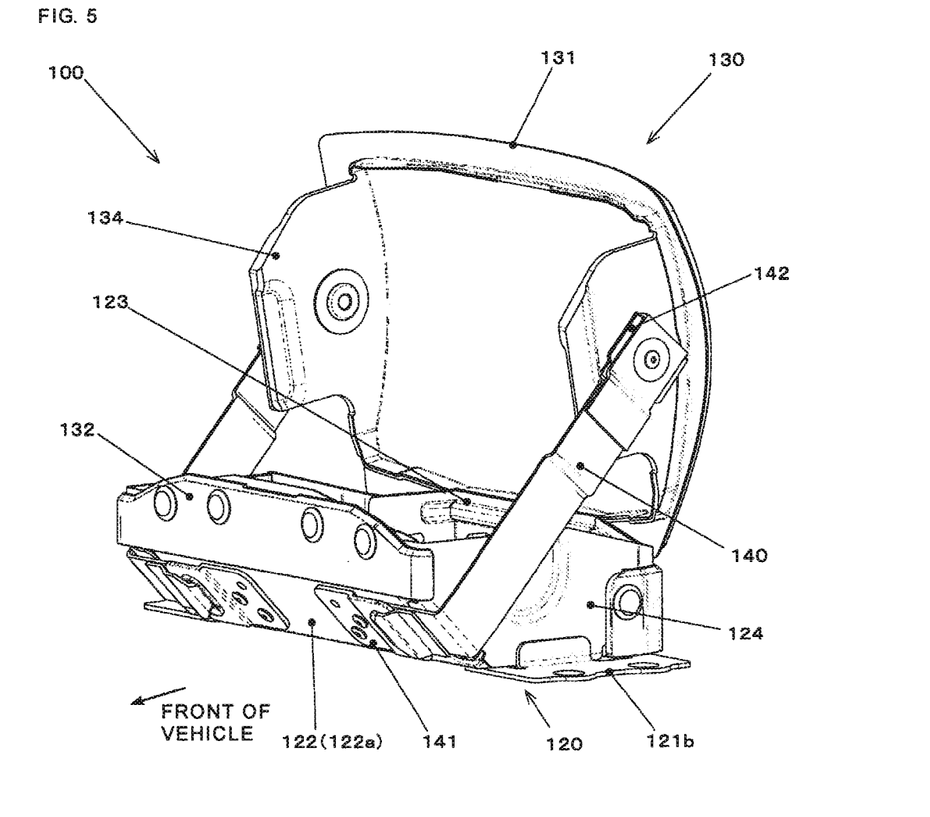
FIG. 5 is an exterior perspective view of the airbag module of FIG. 3, with the cover open (with the bag portion deployed and inflated).

FIG. 5 is an exterior perspective view of the airbag module 100, with the cover open.

Figure 6:
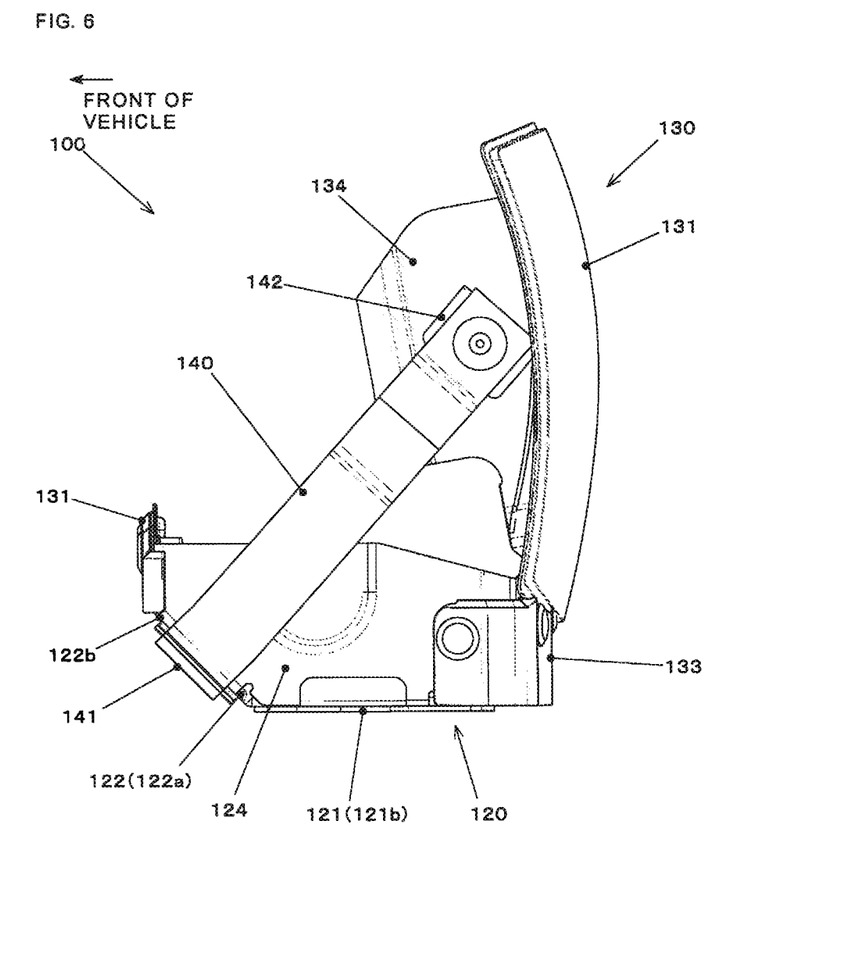
FIG. 6 is a side view of the airbag module of FIG. 3, with the cover open.

FIG. 6 is a side view of the airbag module 100, with the cover open.

Figure 7:
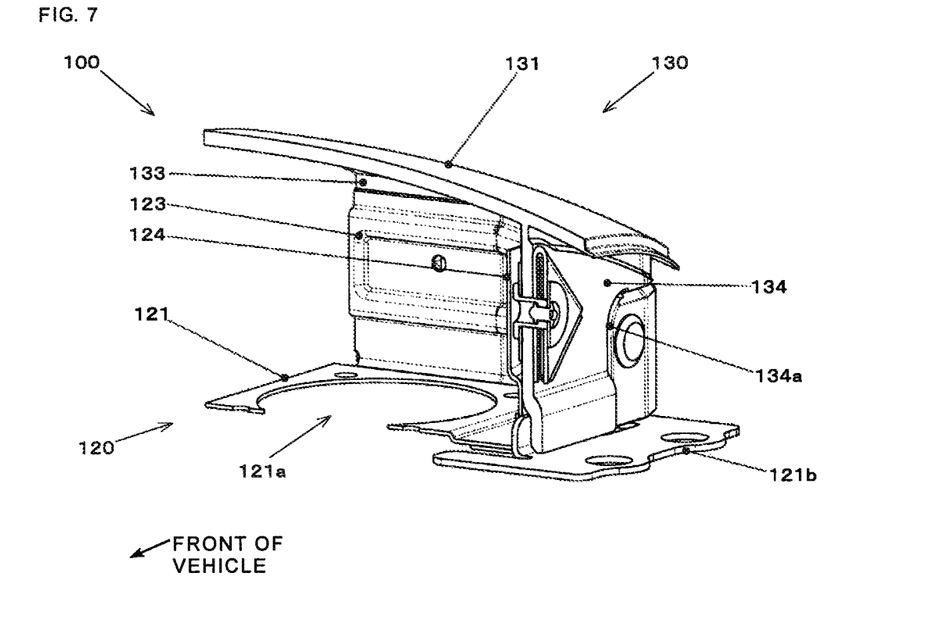
FIG. 7 is a partial sectional perspective view of the airbag module of FIG. 3.

FIG. 7 is a partial sectional perspective view of the airbag module 100.

The airbag module 100 includes a bag 110, a retainer 120, a cover 130, webbings 140, and an inflator (not shown).

In FIG. 3 to FIG. 7, the depiction of the bag 110 and the inflator is omitted.

The bag 110 is formed in a bag shape by sewing or bonding base cloth panels together.

When not in use, the bag 110 is housed, for example, in a rolled or accordion-folded state, in the retainer 120.

If an airbag control device (not shown) detects a collision using a sensor provided, for example, in the front fork 20, the bag 110 is filled with gas for deployment by the inflator, thereby push-opens the cover 130 as shown in FIG. 1, and deploys and inflates over the tank 60 to restrain the upper body of the occupant.

The retainer 120 is formed in a box shape with its top open, for example, by combining sheet metal members made by pressing a steel sheet.

The bag 110 is fixed to the retainer 120, with the inlet 111a facing the lower surface of the retainer 120, using a bag ring 220 of the inflator to be described later.

The retainer 120 includes a lower surface portion 121, a front surface portion 122, a rear surface portion 123, and side surface portions 124.

The lower surface portion 121 is a substantially flat plate-like portion forming the bottom of the retainer 120.

As shown in FIG. 7, an opening 121a to which the inflator is attached is formed in the lower surface portion 121.

In order to fasten the retainer 120, for example, to the frame 10 of the vehicle body, flange portions 121b laterally protruding from the retainer 120 are formed around the lower surface portion 121, The front surface portion 122 has a lower portion 122a that is a substantially flat plate-like inclined surface formed so as to extend obliquely upward from the front end of the lower surface portion 121, and an upper portion 122b that extends upward from the upper end of the lower portion 122a.

The retainer 120 side ends of the webbings 140 are fixed to both ends of the lower portion 122a in the vehicle width direction.

The front surface portion 132 of the cover 130 is fixed to the upper portion 122b.

The rear surface portion 123 is a substantially flat plate-like portion formed so as to extend upward from the rear end of the lower surface portion 121.

The side surface portions 124 are substantially flat plate-like portions formed so as to extend upward from both the left and right ends of the lower surface portion 121, and the front ends and rear ends thereof are joined to both the left and right ends of the front surface portion 122 and the rear surface portion 123.

The cover 130 is a lid-like member that covers the top of the retainer 120 when not in use. When the bag 110 deploys and inflates, as shown in FIG. 1, the cover 130 rotates to open about a hinge disposed, for example, on the vehicle rear side thereof, and restricts the deployment direction of the bag 110.

Figure 8:
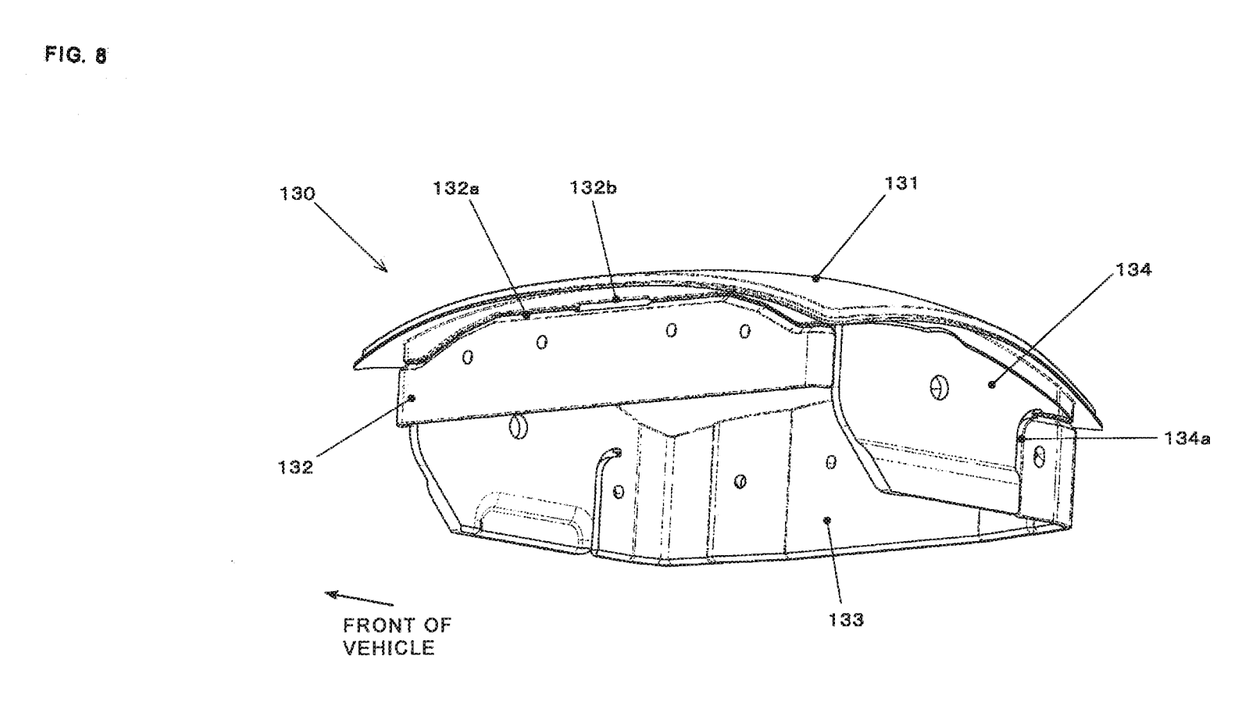
FIG. 8 is an exterior perspective view only of the cover of the airbag module of FIG. 3.
Figure 9:
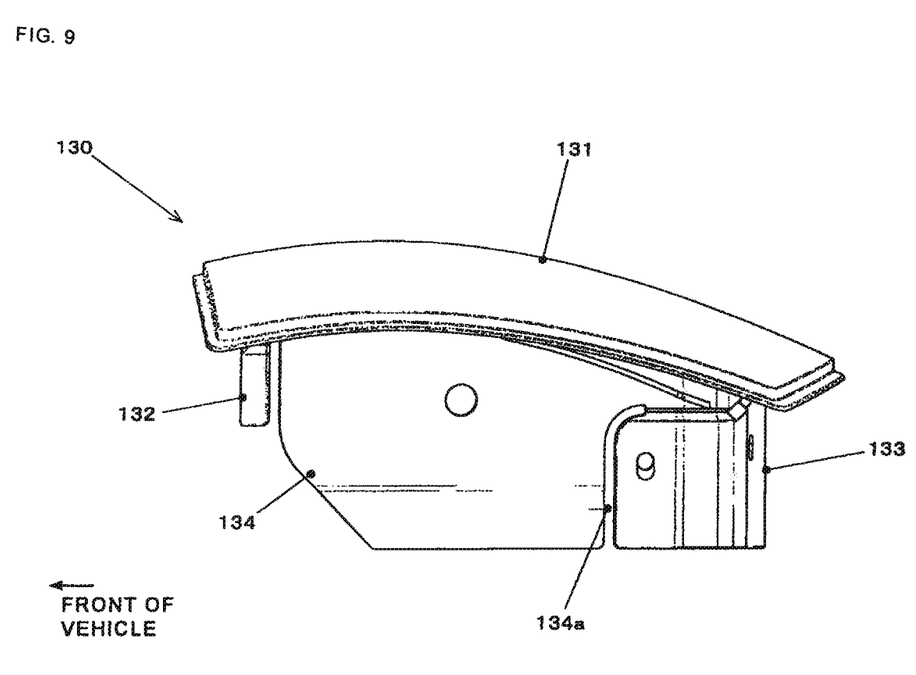
FIG. 9 is a side view of the cover of FIG. 8.

FIG. 8 and FIG. 9 are respectively an exterior perspective view and a side view only of the cover 130.

FIG. 8 shows the cover 130 seen obliquely from the front and obliquely from below.

The cover 130 includes an upper surface portion 131, a front surface portion 132, a rear surface portion 133, and side surface portions 134 that are integrally formed, for example, of a resin-based material.

The upper surface portion 131 is a surface portion that substantially covers the upper opening of the retainer 120 when not in use.

The upper surface portion 131 is formed in a curved surface shape having a shape continuous with the outer surface of the tank 60, and functions as a decorative surface exposed on the outside of the vehicle.

The front surface portion 132 is a substantially plate-like surface portion protruding downward from the front end of the upper surface portion 131.

The front surface portion 132 is fixed to the upper portion 122b of the front surface portion 122 of the retainer 120 using, for example, rivets.

A tear line 132a extending substantially along the vehicle width direction and formed like a groove so as to be smaller in thickness than the other portions is formed in the vicinity of the upper end of the front surface portion 132.

This tear line 132a is a fragile portion that is broken by the pressing force that the upper surface portion 131 is subjected to from the bag 110 at the time of deployment and inflation of the bag 110.

An elongate hole-like opening 132b that is elongate in the vehicle width direction is formed in the middle of the tear line 132a. This opening 132a functions as a starting point where the tear line 132a starts to break.

When the cover 130 is opened, the part of the front surface portion 132 below the tear line 132a remains on the retainer 120 side, and only the part above the tear line 132a rotates and rises together with the upper surface portion 131.

The rear surface portion 133 is a substantially plate-like surface portion protruding downward from the rear end of the upper surface portion 131.

The rear surface portion 133 is fixed to the rear surface portion 123 of the retainer 120 using, for example, rivets.

A hinge portion (not shown) that bends when the cover 130 is opened is formed on the top of the rear surface portion 133 by reducing the thickness like a groove.

The side surface portions 134 are substantially flat plate-like portions protruding downward from both the left and right ends of the upper surface portion 131.

Slits 134a are formed in the side surface portions 134.

The slits 134a extend upward from the lower ends of the rear parts of the side surface portions 134, the upper parts thereof curve toward the rear surface portion 133, and the upper ends thereof are disposed near the upper ends and rear ends of the side surface portions 134.

Gaps are formed between the front ends of the side surface portions 134 and the lateral ends of the front surface portion 132.

When the cover 130 is opened, the parts of the side surface portions 134 in front of the slits 134a rock and rise together with the upper surface portion 131, and the parts of the side surface portions 134 behind the slits 134a remain on the retainer 120 side. The parts of the side surface portions 134 behind the slits 134a are fixed to the side surface portions 124 of the retainer 120, for example, with rivets.

When the bag 110 deploys and inflates, the webbings 140 restrict the rocking of the cover 130 to restrict the deployment direction of the bag 110.

The webbings 140 are each formed by providing a retainer side metal fitting 141 and a cover side metal fitting 142 at both ends of a main body portion formed in a belt-like shape.

The retainer side metal fittings 141 are fixed to the lower portion 122a of the front surface portion 122 of the retainer 120, for example, with rivets.

The cover side metal fittings 142 are connected to the parts of the side surface portions 134 of the cover 130 in front of the slits 134a so as to be able to rotate about an axis substantially perpendicular to the side surface portions 134.

The inflator generates gas for deployment that deploys and inflates the bag portion 100 when an airbag control unit (not shown) detects a vehicle collision.

The airbag control unit determines the vehicle collision, for example, when an acceleration sensor provided in the front fork 20 detects a deceleration greater than or equal to a predetermined threshold value.

According to the present embodiment described above, the tear line 132a provided in the front surface portion 132 of the cover 130 breaks bilaterally symmetrically from the opening 132b, and therefore the deployment positions of the cover 130 and the bag 110 can be made more stable.

The technical scope of the present invention is not limited to the above-described embodiment, and may be appropriately changed. Examples of such changes include the following, which are also within the scope of the present invention.

(1) The airbag apparatus of the above-described embodiment is provided in a motorcycle as an example. The present invention is not limited to this, and can also be applied to other types of saddle-ride type vehicles such as ATVs.

(2) The shape, structure, material, manufacturing method, arrangement, and the like of each part forming the airbag apparatus are not limited to the above-described embodiment, and can be appropriately changed.

(3) In the above-described embodiment, the bag is deployed and inflated after a vehicle collision is detected. However, the present invention is not limited to this. The bag may be deployed and inflated in response to the detection of a precursor of a vehicle collision (pre-crash).

The invention claimed is:

1. An airbag apparatus comprising:
a bag portion formed of a base cloth panel in a bag shape and deployed and inflated in front of a driver by being supplied with gas for deployment;
a retaining container in which the bag portion not in use is housed and at the top of which an opening is provided; and
an airbag cover that substantially covers the opening of the retaining container when not in use and a front portion of which rises to uncover the opening when the bag portion is deployed and inflated,
the airbag apparatus being provided in front of a seat of a saddle-ride type vehicle,
wherein the airbag cover includes an upper surface portion, a front surface portion, a rear surface portion, and side surface portions that are integrally formed,
the upper surface portion is a decorative surface exposed on the outside of the vehicle,
the front surface portion is a plate type of surface portion protruding downward from the front end of the upper surface portion,
the front surface portion has a tear line that extends substantially along the vehicle width direction and that is broken by input from the bag portion when the bag portion is deployed and inflated, and
an elongated hole opening elongated in the vehicle width direction that functions as a starting point where the tear line starts to break is provided in the middle of the tear line in the vehicle width direction.

* * * * *